United States Patent [19]

Chasin et al.

[11] Patent Number: 5,360,107
[45] Date of Patent: Nov. 1, 1994

[54] COMPACT DISC BOX AND MEANS FOR INTERCONNECTING

[76] Inventors: Lawrence C. Chasin, 4 Jamaica Rd., Morris Plain, N.J. 07950; Erik B. Cherdak, 26 S. Main St., #208, Concord, N.H. 03303

[21] Appl. No.: 863,846

[22] Filed: Apr. 6, 1992

Related U.S. Application Data

[63] Continuation of Ser. No. 652,516, Feb. 8, 1991, abandoned.

[51] Int. Cl.$^5$ .................... B65D 85/57; B65D 21/02; F16B 12/00
[52] U.S. Cl. .................... 206/313; 206/444; 220/23.4; 312/9.42; 312/9.48; 312/111
[58] Field of Search ........... 206/307, 309, 312, 313, 206/444; 312/9.41, 9.42, 9.47, 9.48, 111, 334.44, 334.46, 107; 220/23.4, 23.6

[56] References Cited

U.S. PATENT DOCUMENTS

| | | | |
|---|---|---|---|
| 2,785,940 | 3/1957 | Felton | 312/111 X |
| 2,825,614 | 3/1958 | Card | 312/111 |
| 3,112,966 | 12/1963 | Reid | 206/501 X |
| 4,379,507 | 4/1983 | Llabres | 206/444 |
| 4,702,369 | 10/1987 | Philosophe | 206/312 |
| 4,755,982 | 7/1988 | Douwes | 206/312 X |
| 4,771,883 | 9/1988 | Herr et al. | 206/313 |
| 5,011,010 | 4/1991 | Francis et al. | 206/307 |

FOREIGN PATENT DOCUMENTS

| | | | |
|---|---|---|---|
| 2421969 | 12/1974 | Germany | 312/111 |
| 0021009 | 9/1907 | United Kingdom | 206/313 |
| 884776 | 12/1961 | United Kingdom | 312/111 |
| 2116351 | 9/1983 | United Kingdom | 206/313 |

Primary Examiner—Bryon P. Gehman

[57] ABSTRACT

A compact disc box for storing compact discs which provides access to such compact discs by way of a reciprocating drawer. The compact disc boxes can be connected to other compact disc boxes by way of removable couplers. The compact disc boxes can be arranged to form a custom storage arrangement such that the contents of the individual compact disc boxes can be removed from the custom storage arrangement without removing the individual compact disc boxes from the custom storage arrangement.

15 Claims, 4 Drawing Sheets

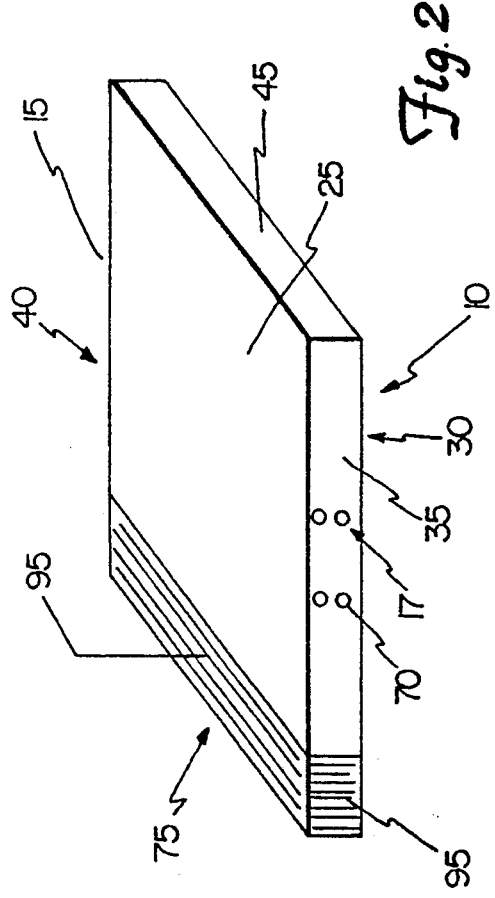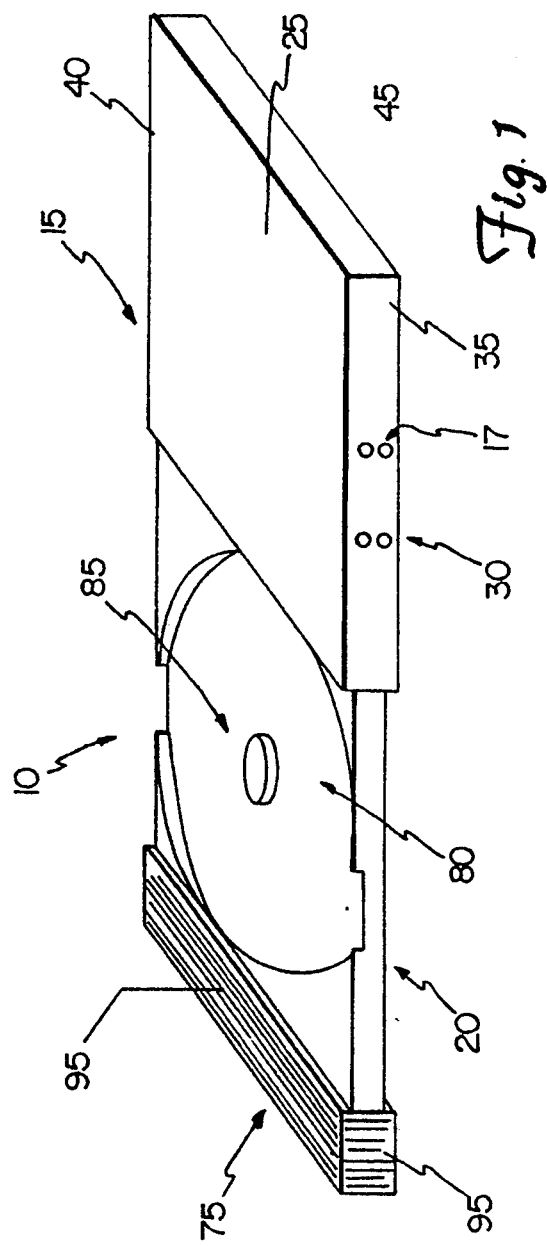

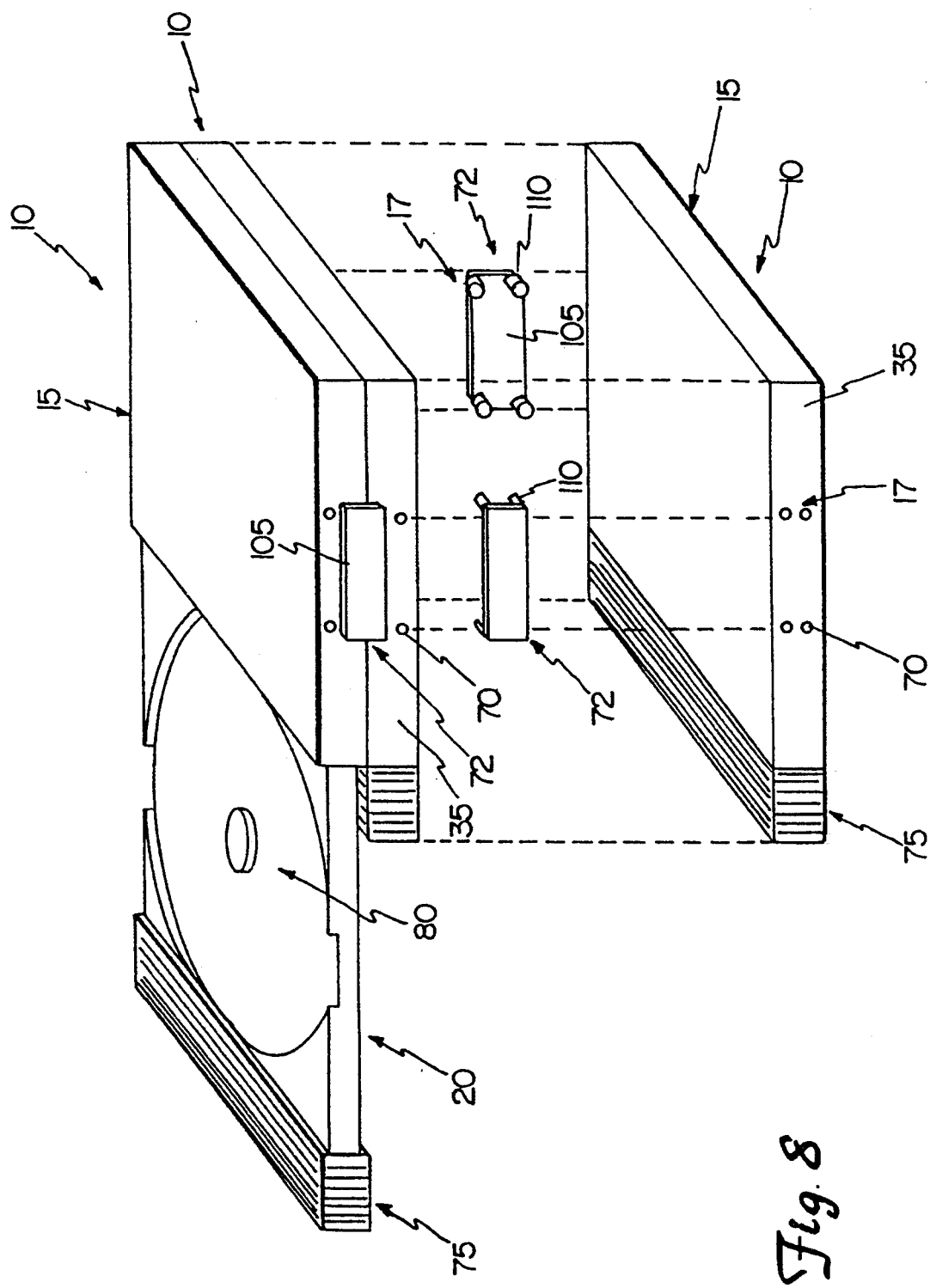

COMPACT DISC BOX AND MEANS FOR INTERCONNECTING

This is a continuation of application Ser. No. 07/652,516, filed Feb. 8, 1991 now abandoned.

BACKGROUND OF THE INVENTION a) Field of the Invention

The present invention relates, generally, to a box for storing compact discs, and, more particularly, to a box which provides access to such compact discs by way of a reciprocating drawer, and even more particularly to a box for storing compact discs which allows connection to other such boxes by way of removable couplers.

b) Related Art

Attention is called to U.S. Pat. Nos. 4,928,816, 4,728,157, 4,863,222, 4,736,840, 4,709,812, 4,903,829.

SETTING OF THE INVENTION

The typical compact disc box is nothing more than a hinged box in which a compact disc is stored. As a result of its hinged design, the typical compact disc box has several drawbacks associated with its use, manufacture, and structure.

In order for a user to access a compact disc contained in a typical compact disc box, the user must hold the base with one hand and pry open the hinged top with the other hand. As a result of repetitive openings and closings of the typical compact disc box, the hinges, being nothing more than thin plastic projections, typically weaken and break. When a hinge breaks the typical compact disc box is no longer usable and must be replaced.

Another drawback of a typical compact disc box is that a large collection of such boxes must be stored in a pre-fabricated, independent storage case. These storage cases must be purchased separately and at substantial expense to the user. A user who desires to transport a collection of typical compact boxes must either purchase a storage case or be faced with the alternative of jumbling the entire collection in the transporting process.

Another drawback of typical compact disc boxes is that a user who stacks such boxes is often hampered from gaining access to the compacts discs which may happen to be located somewhere other than at the top of the stack. As a result of stacking typical compact disc boxes, it is also common that such stacks become structurally unstable.

In order to manufacture a typical compact disc box at least three pieces of plastic must be injection molded, assembled and packaged. Because there are three pieces of plastic, the expense in terms of material, machines, time, and labor is higher than if the box were to be constructed from fewer pieces of plastic.

Thus, there is a need for a compact disc box which can be easily opened and at the same time not be subject to the structural deficiencies of a hinged design. Also, there is a need for compact disc boxes which can be stored and transported without the need for extra cases.

FEATURES AND ADVANTAGES OF THE INVENTION

Accordingly, it is a feature and an advantage of the present invention to provide a compact disc box which overcomes the drawbacks presented above.

It is another feature and advantage of the present invention to provide a compact disc box which opens and closes in a single plane of operation thereby eliminating the need for fragile hinges.

It is a further feature and advantage of the present invention to provide a compact disc box which can be connected to other such compact disc boxes to form a transportable, user-customized storage arrangement.

It is another feature and advantage of the present invention to provide a compact disc box which can be manufactured from two pieces of injected molded plastic.

SUMMARY OF THE INVENTION

The foregoing features and advantages are achieved in a box for storing a compact disc that includes a drawer wherein a compact disc can be stored, and a housing having a plurality of walls wherein the drawer reciprocates from a retracted position in which the compact disc is enclosed within the housing to an extended position in which the compact disc is accessible and removable.

Further, the foregoing features and advantages are achieved in a connector apparatus that includes a device for connecting compact disc boxes to other compact disc boxes such that a plurality of compact disc boxes can be arranged to form a custom storage arrangement.

Still further, the contents of the compact disc boxes can be removed from the custom storage arrangement without removing any of the compact disc boxes from the custom storage arrangement.

BRIEF DESCRIPTION OF THE DRAWINGS

For a more complete understanding of the present invention, reference is made to the following detailed description of exemplary embodiments considered in conjunction with the accompanying drawings, in which:

FIG. 1 is a perspective view of a compact disc box constructed in accordance with the present invention, the compact disc box being shown with its drawer in an extended position;

FIG. 2 is a perspective view of the compact disc box of FIG. 1, the compact disc box being shown with its drawer in a retracted position;

FIG. 8 is an exploded perspective view of the compact disc box of FIGS. 1-2, connected other such compact disc boxes by the connector mechanism of FIGS. 5-6.

DETAILED DESCRIPTION OF THE DRAWINGS

Structure of the Exemplary Embodiments

Figure 4:
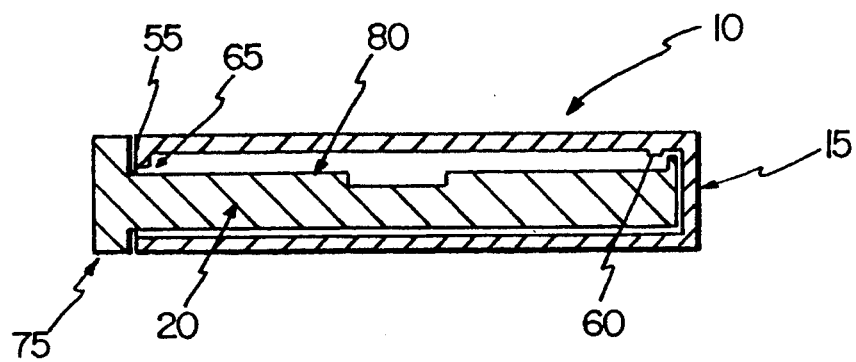
FIG. 4 is a cross-sectional view taken along lines IV—IV of FIG. 2 and looking in the direction of the arrows, of the compact disc box of FIG. 2.

The exemplary embodiments illustrated in FIGS. 1-8 are further defined in the following:

Referring to FIGS. 1–2, a compact disc box 10 is shown to include a housing 15 and a drawer 20 and a connecting mechanism 17. The compact disc box 10 provides a safe storage facility for compact discs and other material, such as paper, pictures and song lyrics, that may be included in the sale of the compact disc. The housing 15 and the drawer 20 can be constructed from plastic or other material commonly used for in conjunction with commonly known injection molding or other mass production techniques. The connecting mechanism 17 can be constructed of hardened rubber or other similar flexible and pliable material.

The housing 15 provides a protective storage area and can be connected to the housings 15 of other compact disc boxes to form a custom storage arrangement as in FIG. 8. These functions, storage and connection, are simultaneously achieved in the housing 15 having the shape of an open-ended rectangular cylinder. The housing 15 includes a top wall 25, a bottom wall 30 (not seen), a first side wall 35, a second side wall 40 (not seen), and a back wall 45.

Figure 3:
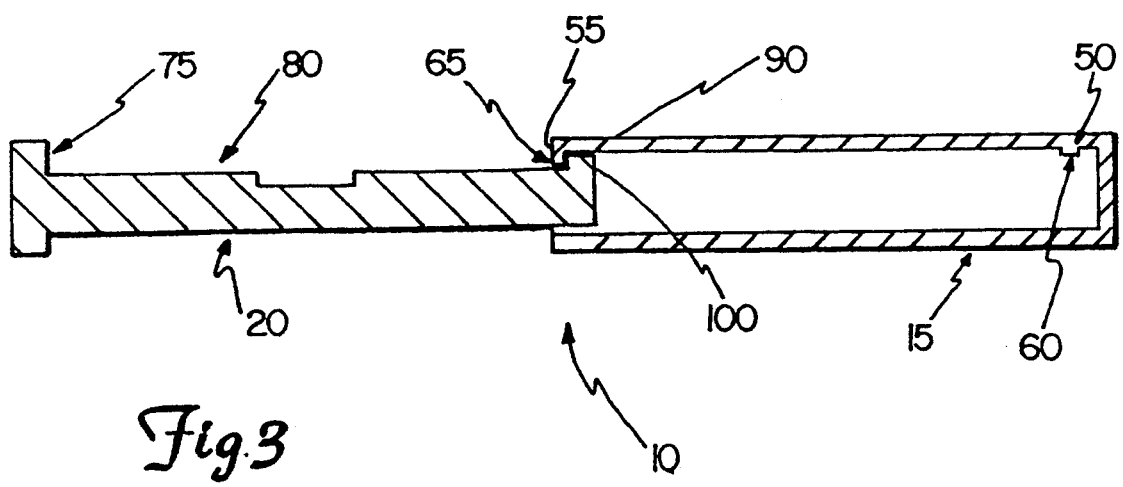
FIG. 3 is a cross-sectional view taken along lines III—III of FIG. 1 and looking in the direction of the arrows, of the compact disc box of FIG. 1.
Figure 5:
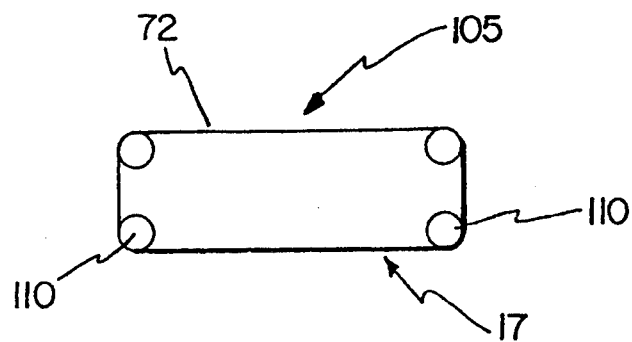
FIG. 5 is a top plan view of a connector mechanism, constructed in accordance with the present invention.
Figure 6:
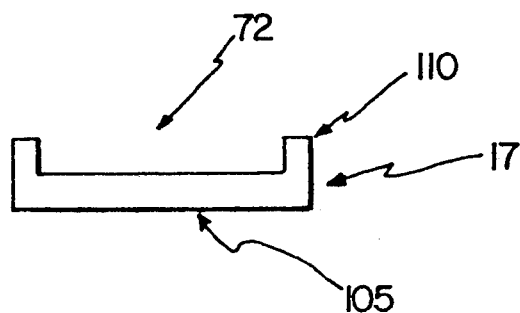
FIG. 6 is a side view of the connector apparatus of FIG. 5.
Figure 7:
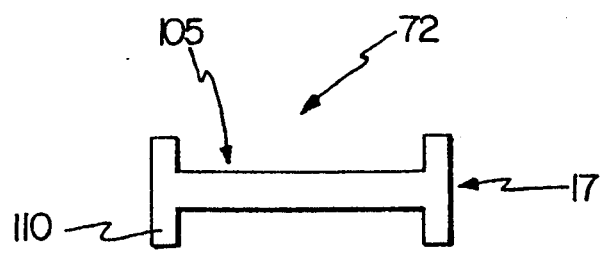
FIG. 7 is a side view of another exemplary embodiment of the connector apparatus.

Referring to FIGS. 3–4 and especially in regard to the storage function of the compact disc box 10, the top wall 35 is shown to include both a retaining mechanism 50 and a stopping mechanism 55. The retaining mechanism 50 prevents the drawer 20 from inadvertently opening when the compact disc box 10 is in a closed position (See FIGS. 2 & 4). The stopping mechanism 55 stops the drawer 20 from being dislodged from the housing 15 when the compact disc box 10 is an open position (See FIGS. 1 & 3).

The retaining mechanism 50 is in the form of a retaining ridge 60 attached to the top wall 25 of the housing 15. The retaining ridge 60 extends from the underside of the top wall 25 sufficiently downward to engage the drawer 20 when the drawer 20 is in the closed position. It should not be under emphasized that the retaining mechanism 50 can be any structure which prevents the drawer 20 from inadvertently opening when the drawer 20 in the closed position as is commonly known in the art. Examples of other such mechanisms may include a plurality of beads or a ridge attached to either the bottom wall 30, first side wall 35 (not shown), second side wall 40, or back wall 45 of the housing 15.

The stopping mechanism 55 is in the from of a stopping ridge 65 attached to the top wall 25 of the housing 15. The stopping ridge 65 extends from the underside of the top wall 25 sufficiently downward to engage the drawer 20 when the drawer 20 is in the open position. It should not be under emphasized that the stopping mechanism 55 can be any structure which prevents the drawer 20 from inadvertently being removed from the housing 15 when the drawer 20 in the open position as is commonly known in the art. Examples of such other mechanisms include a plurality of beads or a ridge attached to either the bottom wall 30, first side wall 35 (not seen), second side wall 40, or back wall 45 of the housing 15.

Referring to FIGS. 1–2 and especially in regard to the connection function, the first side wall 35 and the second side wall 40 (not seen) of the housing 15 include the female couplers 70 of the connecting mechanism 17. The female couplers 70 are circular cavities arranged in pairs of two and have been designed to accept a male coupler 72 (See FIGS. 5–8). The number, shape, size, arrangement and location of the female couplers 70 can be varied to suit particular design considerations of both the compact disc box 10 and of the connecting 17.

The drawer 20, as illustrated in FIGS. 1–4, provides a retractable storage platform 80 for storing a compact disc and allows removal of the compact disc through a single plane of operation. The drawer includes a handle mechanism 75, a storage platform 80, a spindle mechanism 85, and securing mechanism 90. All of the elements of the drawer 20, described in this paragraph, may be constructed from a single mold during an injection molding process.

The handle mechanism 75 is rectangular and positioned on the drawer 20 such that when the compact disc box 10 is closed, the handle mechanism 75 is not completely within the housing 15 thereby enabling a user to easily remove the drawer 20 from the housing 15. The handle mechanism 75 may also include traction bars 95 to insure that there is enough friction between the user's hand and the material from which the drawer 20 has been formed. It should not be under emphasized that the handle mechanism 75 can be of any construction so long as it is not entirely within the housing 15 when the drawer 20 is in the closed position.

The storage platform 80 is recessed from the handle mechanism 75 such that a compact disc does not communicate with the housing 15 and such that the storage platform 80 and compact disc thereon are contained entirely within the volume of the compact disc box 10. The spindle mechanism 85 is located in the center of the storage platform 80 and its construction is well known in the art.

The securing mechanism 90, as illustrated in FIGS. 3–4, is in the from of a securing ridge 100 protruding from the top side of the storage platform 80. The securing ridge 100 protrudes sufficiently upward to engage the retaining ridge 60 when the drawer 20 is in the closed position and to engage the stopping ridge 65 when the drawer is in the open position. It should not be under emphasized that the securing mechanism 90 can be any structure which prevents the drawer 20 from inadvertently opening when the drawer 20 in the closed position and which prevents the drawer 20 from inadvertently being removed from the housing 15 when the drawer 20 is in the open position. Examples of such other mechanisms include a plurality of beads or a ridge attached to either the underside or sides of the storage platform 80 or anywhere else that allows the above functions.

Referring to FIGS. 5–8, the connecting mechanism 17 allows connection of one compact disc box 10 to other compact disc boxes 10. The male coupler 72 of the connecting mechanism 17 includes a coupling bracket 105 and coupling pins 110. The coupling pins 110 are arranged in pairs of two and have been designed to be inserted into the female couplers 70 of the connecting mechanism 17 (See FIGS. 1–2). The number, shape, size, arrangement and location of both the coupler bracket 105 and the coupler pins 110 can be varied to suit particular design considerations of both the compact disc box 10 and the connecting mechanism 17.

Operation of the Exemplary Embodiments

To open a compact disc box 10 for such purpose as removing a compact disc, a user takes hold of the handle mechanism 75 of the drawer 20 and applies an outward force thereon. As the drawer 20 begins to reciprocate from its retracted position (See FIGS. 2, 4) to its extended position (See FIGS. 1, 3), the securing ridge 100 of the drawer 20 disengages from the retaining ridge 60 of the housing 15. The drawer 20 will continue to move outward until the securing ridge 100 engages the stopping ridge 65 at which time the compact disc can be removed from the storage platform 80.

To close a compact disc box 10 for such purpose as replacing a compact disc, a user takes hold of the handle mechanism 75 of the drawer 20 and applies an inward force thereon. As the drawer 20 begins to reciprocate from its extended position (See FIGS. 1,3) to its retracted position (See FIGS. 2, 4), the securing ridge 100 of the drawer 20 disengages from the stopping ridge 65 of the housing 15. The drawer 20 continues to move inward until the securing ridge 100 engages the retaining ridge 60 at which time the storage platform 80 is completely enclosed within the housing 15 and the compact disc is safely stored therein.

Referring to FIG. 8, a user creates a custom storage arrangement of compact disc boxes 10, by attaching a male coupler 72 to the female couplers 70 of two adjacent compact disc boxes 10. A first compact disc box 10 is connected to a second compact disc box 10 when the user aligns and places a first set of the coupling pins 110 of a male coupler 72 to a first set of female couplers 70 of a first compact disc box 10 and aligns and places a second set of coupling pins 110 of the male coupler 72 to a second set of female couplers 70 of a second compact disc box 10. By attaching other male couplers 72 to other female couplers 70 of other adjacent compact disc boxes 10 the user is able to create various horizontal and vertical custom arrangements of compact disc boxes.

It will be understood that the embodiments described herein are merely exemplary and that a person skilled in the art may make many variations and modifications without departing from the spirit and scope of the invention. All such modifications are intended to be included within the scope of the invention as defined in the appended claims.

We claim:

1. A compact disc box comprising:
    a drawer wherein a compact disc is stored;
    a housing having two side walls wherein said drawer can be reciprocated from a retracted position in which said compact disc is enclosed within said housing to an extended position in which said compact disc is accessible and removable; and
    a plurality of female connecting means disposed upon said side walls for connecting said compact disc box to other structures above, below and otherwise adjacent to said compact disc box, each of said plurality of female connecting means being operatively accessible from a direction substantially perpendicular to said side walls.

2. A compact disc box as in claim 1, wherein said drawer includes means for holding said compact disc and handle means allowing a person to cause said drawer to reciprocate from said retracted position to said extended position or from said extended position to said retracted position.

3. A compact disc box as in claim 2, wherein said handle means comprises a gripping portion of said drawer that extends beyond said housing when said drawer is in said retracted position such that said drawer can be reciprocated from said retracted position to said extended position by pulling said gripping portion and such that said drawer can be reciprocated from said extended position to said retracted position by pushing said gripping portion.

4. A compact disc box as in claim 1, further comprising a retaining means for retaining said drawer in said housing when said drawer is in said retracted position.

5. A compact disc box as in claim 4, wherein said retaining means comprises:
    at least one retaining ridge protruding from the underside of a top wall of said housing; and
    a lip portion on said drawer such that when said drawer is in said retracted position said retaining ridge interacts with said lip portion to retain said drawer in said retracted position when said drawer is not being reciprocated.

6. A compact disc box as in claim 1, further comprising a stopping means for stopping said drawer from being removed from said housing when said drawer is in said extended position.

7. A compact disc box as in claim 6, wherein said stopping means comprises:
    at least one stopping ridge protruding from the underside of a top wall of said housing; and
    a lip portion on said drawer such that when said drawer is in said extended position said stopping ridge interacts with said lip portion to stop said drawer in said extended position when said drawer is not being reciprocated.

8. The compact disc box as in claim 1, wherein said female connecting means includes a first pair of cavities in a first horizontal plane.

9. The compact disc box as in claim 8, wherein said female connecting means includes a second pair of cavities in a second horizontal plane.

10. A compact disc box comprising:
    a drawer wherein a compact disc is stored;
    a housing having a top wall, a bottom wall, a first side wall, a second side wall, and a back wall, wherein said drawer can be reciprocated from a retracted position in which said compact disc is enclosed within said housing to an extended position in which said compact disc is accessible and removable, said drawer being operable with said housing such said compact disc is oriented towards said top wall;
    top connecting means disposed upon said first side wall and upon said second side wall such that said top connecting means disposed upon said first side wall is operatively accessible from a first direction substantially perpendicular to said first side wall and said top connecting means disposed upon said second side wall is operatively accessible from a second direction substantially perpendicular to said second side wall for connecting said compact disc box to other structures positioned above said top wall of said compact disc box and for connecting said compact disc box to other structures positioned adjacent to said first side wall and to other structures positioned adjacent to said second side wall, said top connecting means disposed upon said first side wall and upon said second side wall such that said top connecting means will not interfere with said drawer when said drawer is reciprocated or retracted; and
    bottom connecting means disposed upon said first side wall and upon said second side wall such that said bottom connecting means disposed upon said first side wall is operatively accessible from said first direction and said bottom connecting means disposed upon said second side wall is operatively accessible from said second direction, said bottom connecting means for connecting said compact disc box to other structures positioned below said bottom wall of said compact disc box and for connecting said compact disc box to other structures positioned adjacent to said first side all and to other structures positioned adjacent to said second side wall, said bottom connecting means disposed upon said first side wall and upon said second side all such that said bottom connecting means will not interfere with said drawer when said drawer is reciprocated or retracted, said top connecting means and said bottom connecting means being oriented in different horizontal planes.

11. A kit for storing compact discs comprising:

a plurality of compact disc boxes, each of said compact disc boxes comprising a drawer wherein a compact disc is stored, and a housing having a top wall, a bottom wall, a first side wall, a second side wall, a back wall, and upper female connecting means and lower female connecting means each disposed in different horizontal planes upon said first side wall and upon said second side wall, wherein said drawer reciprocates from a retracted position in which said compact disc is enclosed within said housing to an extended position in which said compact disc is accessible and removable; and a plurality of separately attachable and detachable male connecting means operable with said upper female connecting means and with said lower female connecting means in a direction substantially perpendicular to said sidewalls for connecting each compact disc box of said plurality of compact disc boxes to at least one other compact disc box of said plurality of compact disc boxes, such that said plurality of compact disc boxes can be removed from or inserted into custom vertical and horizontal storage arrangements without removing said compact disc boxes from said custom vertical and horizontal storage arrangements.

12. The kit for storing compact discs as in claim 11, wherein each of said male connecting means comprises:

a body having a top surface and a bottom surface such that said bottom surface has a plurality of coupler pins disposed thereon and protruding therefrom.

13. The kit for storing compact discs as in claim 12, wherein each of said male connecting means further comprises a plurality of coupler pins disposed on and protruding from said top surface of said body of said male connecting means whereby said plurality of compact disc boxes can be arranged to form custom horizontal and vertical storage arrangements.

14. The kit for storing compact discs as in claim 13, wherein said female connecting means are cavities corresponding to the number, shape, size and arrangement of said coupler pins 15. The kit for storing compact discs as in claim 12 wherein said female connecting means are cavities corresponding to the number, shape, size and arrangement of said coupler pins.

* * * * *